United States Patent
Martinez

(10) Patent No.: US 9,313,052 B2
(45) Date of Patent: Apr. 12, 2016

(54) METHOD AND APPARATUS FOR SIGNAL TRANSMISSION

(75) Inventor: Jose Martinez, Munich (DE)

(73) Assignee: Infineon Technologies Austria AG, Villach (AU)

( * ) Notice: Subject to any disclaimer, the term of this patent is extended or adjusted under 35 U.S.C. 154(b) by 2484 days.

(21) Appl. No.: 12/023,623

(22) Filed: Jan. 31, 2008

(65) Prior Publication Data

US 2009/0196358 A1 Aug. 6, 2009

(51) Int. Cl.
| | |
|---|---|
| H04B 3/00 | (2006.01) |
| H04L 27/00 | (2006.01) |
| H04B 15/00 | (2006.01) |
| H04L 25/02 | (2006.01) |

(52) U.S. Cl.
CPC .................................. *H04L 25/0264* (2013.01)

(58) Field of Classification Search
CPC ..................... H04L 25/0272; H04L 25/0264
See application file for complete search history.

(56) References Cited

U.S. PATENT DOCUMENTS

| | | | |
|---|---|---|---|
| 4,027,152 A | | 5/1977 | Brown et al. |
| 4,374,432 A | * | 2/1983 | Kenner et al. ................. 365/209 |
| 5,594,379 A | | 1/1997 | Kiraly |
| 5,952,849 A | | 9/1999 | Haigh |
| 6,262,600 B1 | | 7/2001 | Haigh et al. |
| 7,426,239 B2 | | 9/2008 | Taghizadeh-Kaschani |
| 7,492,827 B2 | | 2/2009 | Feldtkeller |
| 2003/0151442 A1 | * | 8/2003 | Strzalkowski ................. 327/300 |
| 2004/0005009 A1 | * | 1/2004 | Taghizadeh-Kaschani .. 375/259 |
| 2004/0101036 A1 | * | 5/2004 | Strzalkowski ................. 375/220 |
| 2004/0102164 A1 | * | 5/2004 | Taghizadeh-Kaschani .. 455/130 |
| 2005/0211878 A1 | * | 9/2005 | Taghizadeh-Kaschani et al. ............................ 250/210 |
| 2006/0022346 A1 | * | 2/2006 | Feldtkeller .................... 257/760 |
| 2006/0269002 A1 | * | 11/2006 | Feldtkeller .................... 375/258 |
| 2006/0276155 A1 | | 12/2006 | Feldtkeller |
| 2007/0258513 A1 | | 11/2007 | Strzalkowski |
| 2010/0014568 A1 | | 1/2010 | Strzalkowski |

FOREIGN PATENT DOCUMENTS

| | | |
|---|---|---|
| DE | 102 29 860 A1 | 1/2004 |
| DE | 102 43 197 A1 | 4/2004 |
| DE | 102 28 543 A1 | 11/2005 |
| DE | 10 2004 039 218 A1 | 3/2006 |

* cited by examiner

*Primary Examiner* — Aristocratis Fotakis
(74) *Attorney, Agent, or Firm* — Slater & Matsil, L.L.P.

(57) ABSTRACT

A method for receiving signals includes detecting information signal pulses on a first signal transmission channel, generating an output signal dependent on the information signal pulses on the first signal transmission channel, and detecting interference signal pulses on a second signal transmission channel. The second signal transmission channel is open-ended or terminated by a passive component, and interference signal pulses on the first signal transmission channel that occur within a given time window before or after an interference signal pulse on the second signal transmission channel has been detected are ignored and not used for generating the output signal.

23 Claims, 6 Drawing Sheets

METHOD AND APPARATUS FOR SIGNAL TRANSMISSION

BACKGROUND

In the transmission of electrical signal pulses over transmission channels, errors may occur due to disturbance signals, like electromagnetic interference signals, that are coupled into the transmission channel.

SUMMARY OF THE INVENTION

A first aspect of the present disclosure relates to a signal transmission arrangement comprising: a first signal transmission channel having an input terminal, and an output terminal; a transmitter circuit connected to the input of the first transmission channel; a second signal transmission channel having an input terminal that is open-ended or that is terminated by a passive component, and having an output terminal; a receiver circuit that is connected to the output of the first and second signal transmission channels, that is adapted to detect signal pulses on the first signal transmission channel and to provide a receiver output signal dependent on the detection of signal pulses, that is adapted to detect signal pulses on the second transmission channel, and that is adapted to ignore such signal pulses on the first transmission channel for the generation of the output signal that occurring within a given time window before or after a signal pulse on the second transmission signal has been detected.

A second aspect relates to a method for transmitting signals, comprising: providing a first signal transmission channel and a second signal transmission channel each having an input and an output, wherein the input of the second transmission is open-ended or is terminated by a passive component; detecting signal pulses on the first transmission channel and generating an output signal dependent on the detection of signal pulses on the first transmission channel; detecting signal pulses on the second transmission channel and; ignoring signal pulses on the first transmission channel for the generation of the output signal that occur within a given time window before or after a signal pulse on the second transmission signal has been detected.

BRIEF DESCRIPTION OF THE DRAWINGS

Examples will now be explained with reference to drawings. The drawings serve to illustrate the basic principles of the invention. Therefore, only those aspects required for illustrating the basic principle are depicted. Same reference signs denote same circuit blocks and same signals throughout the drawings.

DETAILED DESCRIPTION OF ILLUSTRATIVE EMBODIMENTS

Figure 1:
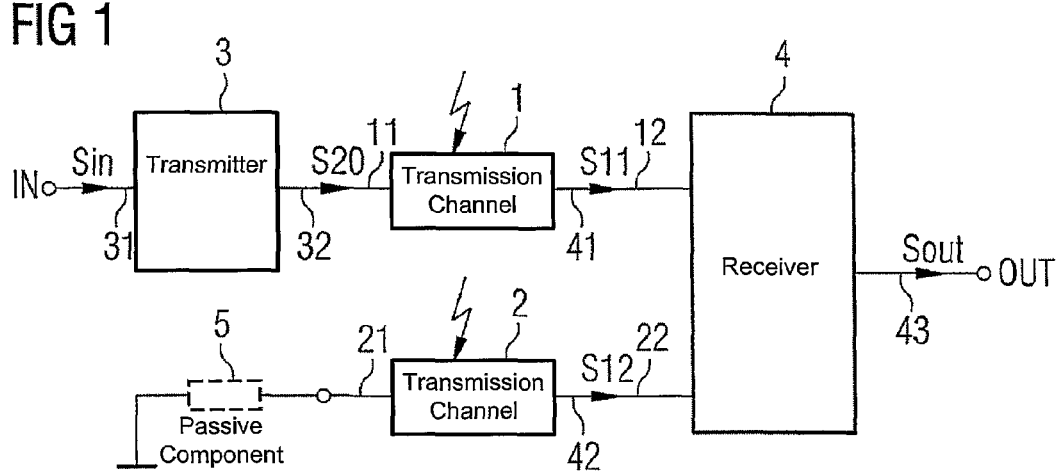
FIG. 1 illustrates a signal transmission arrangement that includes two transmission channels, a transmitter circuit and a receiver circuit.

FIG. 1 illustrates an example of a signal transmission arrangement. The arrangement comprises an input IN for receiving an input signal $S_{in}$, which will be referred to as information signal $S_{in}$ in the following, and an output OUT for providing an output signal $S_{out}$. The transmission arrangement further comprises two transmission channels: a first transmission channel 1, which will be referred to as an information transmission channel in the following, and a second transmission channel 2, which will be referred to as an interference detection channel in the following. The two transmission channels 1, 2 may be realized in an identical manner, and are each adapted to transmit signals across distances and/or a potential barrier.

The transmission arrangement further includes a transmitter circuit 3 that has an input terminal 31 for receiving the information signal $S_{in}$ and an output terminal 32 for providing a transmission signal S20 to be transmitted via the information transmission channel 1. Transmitter circuit 3 is adapted to transform (modulate) information signal $S_{in}$ into transmission signal S20, with transmission signal S20 being adapted to be transmitted via information transmission channel 1.

A receiver circuit 4 is connected to the output 12 of information transmission channel 1 and receives a first channel output signal S11 from information transmission channel 1. The first channel output signal S11 is dependent on the transmission signal S20; depending on the transmission characteristic of the information transmission channel 1 the first channel output signal S11 may have a different signal form as compared to the transmission signal S20. The first channel output signal S11 is further dependent on interference signals that are coupled into the information transmission channel 1. Such interference signals that also affect interference detection channel 2 are represented by arrows in FIG. 1.

Interference signals that are coupled into information transmission channel 1 and interference detection channel 2 may result from electromagnetically discharge processes (EMI, Electromagnetic Interference) signals in the following. It should be noted that these interference signals are not signals that are present at the output 32 of transmitter circuit 3, but are coupled into information transmission channel 1 in various manners by any processes that cause such interference signals, or disturbance signals.

Interference detection channel 2 does not contribute to information transmission, but only serves to receive the same interference signals that are coupled into information transmission channel 1. The input terminal 21 of interference detection channel 2 is open-ended or is terminated using a passive component 5 (shown in dashed line in FIG. 1). The passive component 5 may be or may include an ohmic resistor or may include a capacitor. In particular the passive component may be a parallel RC member that includes a parallel circuit of an ohmic resistor and a capacitor, or may be a serial RC member that includes a series circuit of an ohmic resistor and a capacitor.

Since the input terminal 21 of interference detection channel 2 is open-ended or terminated by a passive component, an output signal S12 that is present at the output 22 of the channel 2 is only dependent on interference signals coupled into the interference detection channel 2.

Besides a first input terminal 41 that is connected to the output terminal 12 of the information transmission channel 1 receiver circuit 4 includes a second input terminal 42 that is connected to the output 22 of interference detection channel 2. The output signal S12 of interference detection channel 2 will be referred to as second channel output signal in the following.

Receiver circuit 4 is adapted to generate the output signal $S_{out}$ dependent on the first and second channel output signals S11, S12 in such a way that signal pulses in the first channel output signal S11 are ignored for generating the output signal $S_{out}$ if they are within a given time window before or after a signal pulse in the second channel output signal S12 occurs. The basic idea in this connection is that two signal pulses (one signal pulse in the first channel output signal S11, and one signal pulse in the second channel output signal S12) that occur within a given time window do result from an interference signal that is coupled into both transmission channels 1, 2. The signal pulse in the first channel output signal S11 resulting from such an interference signal should therefore be ignored in generating the output signal $S_{out}$ to thereby prevent an error in the output signal $S_{out}$.

Figure 2:
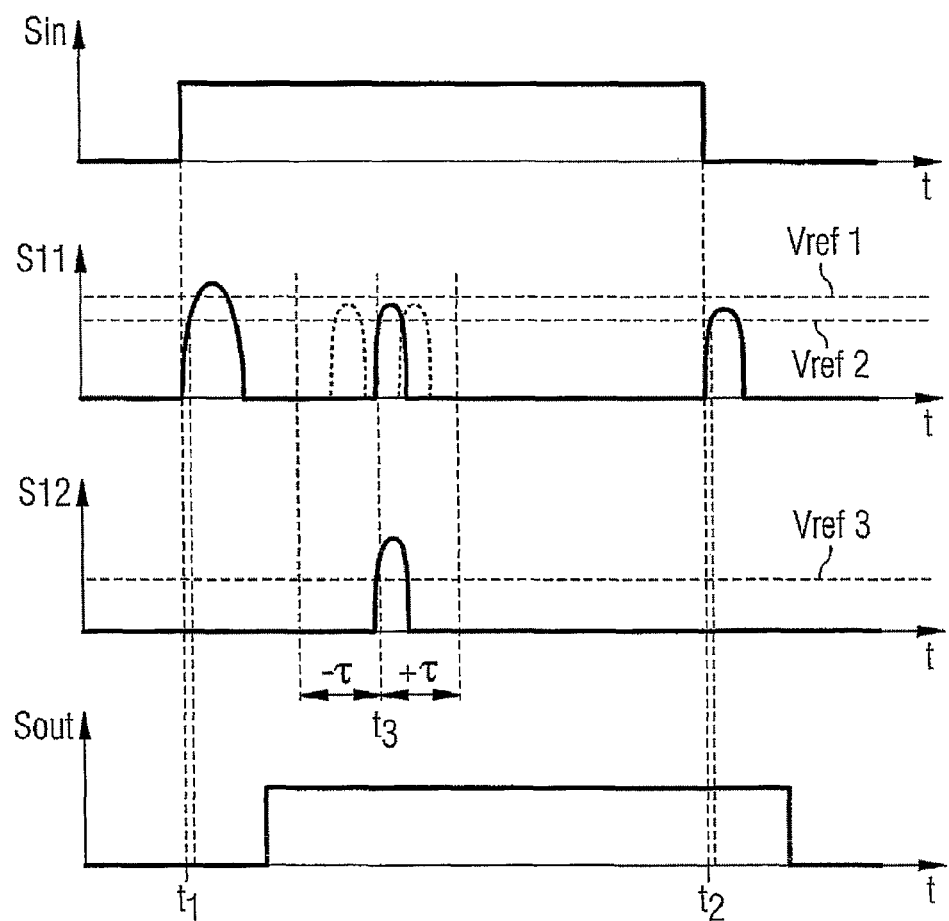
FIG. 2 illustrates the functionality of the transmission arrangement according to FIG. 1 by way of timing diagrams.

Exemplary functionality of the signal transmission arrangement according to FIG. 1 will now be explained using timing diagrams shown in FIG. 2. For explanation purposes FIG. 2 shows examples of timing diagrams of the information signal $S_{in}$, the first and second channel output signals S11, S12, and the output signal $S_{out}$. For explanation purposes it may further be assumed that information signal $S_{in}$ is a logic signal that may assume one of a first and second signal level, where the first signal level is a high-level, and the second signal level is a low-level in the following. In the example shown in FIG. 2 information signal $S_{in}$ has a rising edge at a first time t1 and a falling edge at a second time t2. For explanation purposes it may further be assumed that a first signal pulse is transmitted via the information transmission channel 1 each time a rising edge of information signal $S_{in}$ occurs, and a second signal pulse is transmitted via information transmission channel 1 each time a falling edge of the information signal $S_{in}$ occurs. In the example of FIG. 2 the first signal pulse, that indicates the rising edge of information signal $S_{in}$, and the second signal pulse, that indicates the falling edge of information signal $S_{in}$, are generated in such a manner that they have different amplitudes in order to enable receiver 4 to distinguish between pulses indicating rising edges and pulses indicating falling edges of the information signal $S_{in}$.

Signal pulses indicating a rising edge and signal pulses indicating a falling edge may be different in other features, like steepness of rising or falling edges, as well. According to a further example (not shown) only one signal pulse is transmitted for one of the rising and falling edges, while two directly subsequent pulses are transmitted for the other of rising and falling edges.

In the example of FIG. 2, receiver circuit 4 is adapted to generate a rising edge of output signal $S_{out}$ after a given time delay after a first signal pulse has been detected, and is adapted to generate a falling edge of output signal $S_{out}$ after a given time delay after a second signal pulse has been detected. A first signal pulse is detected if a pulse amplitude is higher than a first reference value Vref1, while a second signal pulse is detected if a pulse amplitude is higher than a second reference value Vref2 but lower than a first reference value Vref1, where the first reference value Vref1 is higher than the second reference value Vref2 (Vref1>Vref2).

In FIG. 2, t3 is a time when a signal pulse in the second channel output signal S12 is detected. For purpose of explanation it may be assumed that time t3 is the time when an amplitude of the signal pulse reaches or rises above a third reference value Vref3. The third reference value Vref3 may be lower and may even be much lower than the second reference value Vref2. Under the assumption that signal pulses resulting from interference occur on the first and second channel 1, 2 on the same time, then the signal pulse on the second channel 2 is detected earlier than the signal pulse on the first channel, if the third reference value Vref3 is lower than the second reference value. This may be helpful in taking suitable actions in order to avoid that the signal pulse on the first channel 1 is erroneously detected as an information signal.

Signal pulses that occur in the first channel output signal S11 within a first time window before the signal pulse in the second channel output signal S12 is detected, and signal pulses in the first channel output signal S11 that occur within a second time window after the signal pulse in the second channel output signal S12 is detected are ignored for generating the output signal $S_{out}$. Thus, even if such signal pulses in the first channel output signal S11 that occur within the first and second time window have an amplitude that is higher than the first or second reference value Vref1, Vref2 no change in the signal level of the output signal $S_{out}$ is generated. In FIG. 2, $-\tau$ denotes the first time window, while $+\tau$ denotes the second time window. The duration of these time windows $-\tau$, $+\tau$ may be identical, or may differ from one another.

Figure 3:
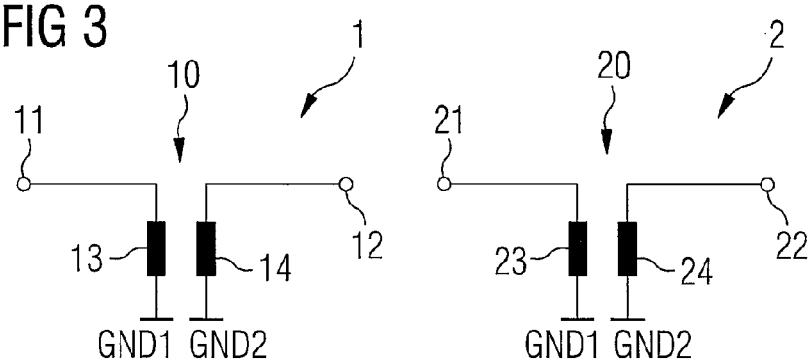
FIG. 3 shows examples of transmission channels that include a transformer.

Referring to FIG. 3 the first and second transmission channels 1, 2 may each include a transformer 10, 20, with each of these transformers 10, 20 including a primary winding 13, 23 and a secondary winding 14, 24. The primary winding 13, 23 and the secondary winding 14, 24 of each of these transformers 10, 20 are magnetically coupled to each other. The transformers 10, 20 are, for example, so-called coreless transformers. Such coreless transformers do not include a transformer core and are, therefore, suitable to be realized in a space-saving manner, and are, in particular, suitable to be realized in an integrated circuit.

Transmission channels that include a transformer are suitable for transmitting signals across potential barriers. Such transmission channels are required in cases in which a first circuit (not shown in FIG. 1) that generates the information signal $S_{in}$ and a second circuit (not shown in FIG. 1) that receives output signal $S_{out}$ have different reference potentials (grounds). Such different reference potentials are referred to as first reference potential GND1 and second reference potential GND2 in FIG. 3. Potential barriers across which signals are to be transmitted are, for example, present in fly-back converters in which signals are to be transmitted from a secondary side to a primary side of the converter, or in drive circuits for driving so-called high-side switches. In high-side switch applications information signal $S_{in}$ is, for example, a control signal for the high-side switch.

Figure 4:
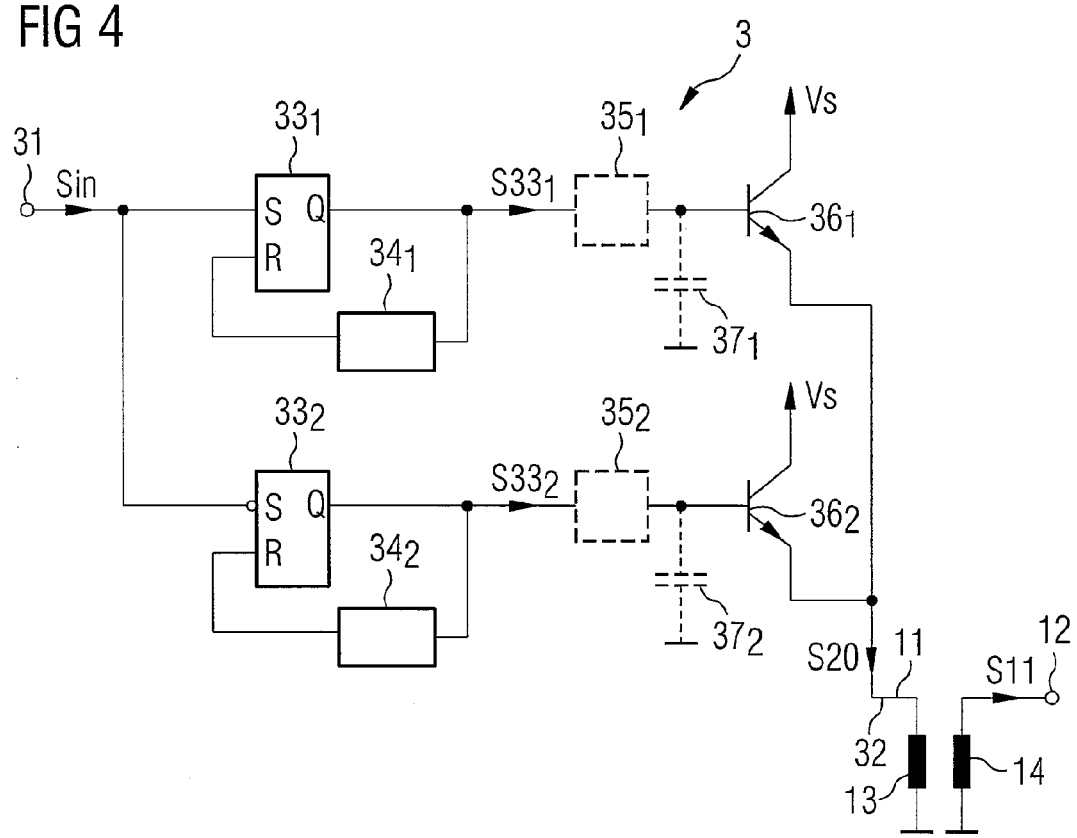
FIG. 4 illustrates an example of a transmitter circuit.

FIG. 4 illustrates an example of a transmitter circuit that is adapted to generate from the information signal $S_{in}$ a transmission signal S20 that is suitable to be transmitted via a transmission channel that includes a transformer. The transmitter circuit 3 in FIG. 4 includes an input stage for generating pulse signals $S33_1$, $S33_2$ that represent rising and falling edges of the information signal $S_{in}$, and an output stage that receives the pulse signals $S33_1$, $S33_2$ and that generates the transmission signal S20. In the present example the transmission signal S20 is a voltage that is applied to the primary winding 13 of the transformer of the first transmission channel 1.

Figure 5:
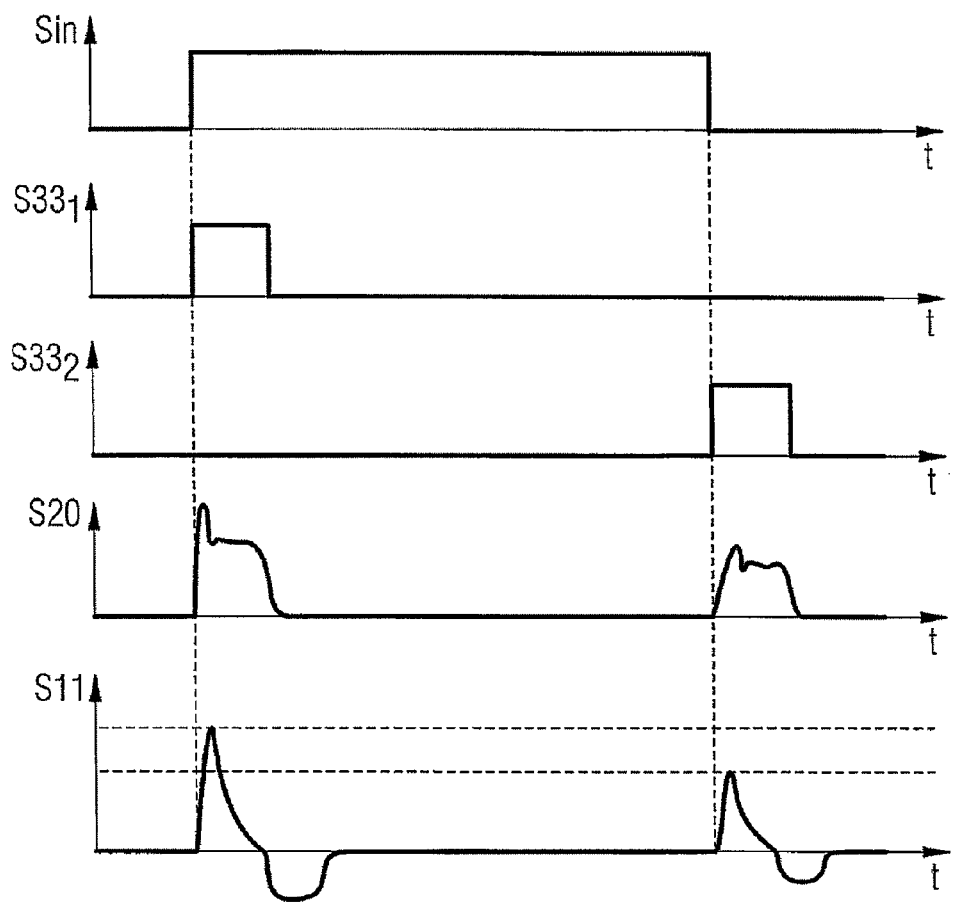
FIG. 5 illustrates the functionality of the transmitter circuit according to FIG. 4 by way of timing diagrams.

FIG. 5 illustrates the functionality of the transmitter circuit 3 using timing diagrams of information signal $S_{in}$, first and second pulse signals $S33_1$, $S33_2$ and the transmission signal S20. FIG. 5 further shows the first channel output signal S11 that results from transmission signal S20. In the example the first channel output signal S11 is the voltage across the secondary winding 14 of the first transformer 10.

Referring to the example in FIG. 4 the input stage of the transmitter circuit 3 comprises a first flip-flop $33_1$ receiving the information $S_{in}$ on a non-inverting set input, and a second flip-flop $33_2$ receiving the input signal $S_{in}$ on an inverting set input. First flip-flop $33_1$ provides the first pulse signal $S33_1$ at its non-inverting output terminal Q, and second flip-flop $33_2$ provides second pulse signal $S33_2$ at its non-inverting output Q terminal. The output terminal Q of each of these flip-flops $33_1$, $33_2$ via a delay element $34_1$, $34_2$ is coupled to its non-inverting reset input R. Both flip-flops $33_1$, $33_2$ according to the example are edge-triggered flip-flops, where first flip-flop $33_1$ is set with a rising edge of information signal $S_{in}$, and where second flip-flop $33_2$ is set with a falling edge of information signal $S_{in}$. Referring to FIG. 5 a signal pulse of the first pulse signal $S33_1$ is generated at the time when a rising edge of the information signal $S_{in}$ occurs, and a signal pulse of the second pulse signal $S33_2$ is generated at the time when a falling edge of the information signal $S_{in}$ occurs. The duration of the two signal pulses is dependent on a delay of delay elements $34_1$, $34_2$, where the first delay element $34_1$ determines the duration of the first signal pulse $S33_1$, and the delay of the second delay element $34_2$ determines the duration of the second signal pulse $S33_2$. Each of the delay elements $34_1$, $34_2$ resets one of the flip-flops $33_1$, $33_2$ after its delay time each time after the flip-flop $33_1$, $33_2$ has been set, thereby causing first and second signal pulses $S33_1$, $S33_2$ to be generated. The delay times of delay elements $34_1$, $34_2$—and therefore the durations of first and second signal pulses $S33_1$, $S33_2$—may be identical, or may differ from one another.

Referring to the example in FIG. 4 the output stage comprises a first transistor $36_1$ that is controlled by the first pulse signal $S33_1$, and a second transistor $36_2$, that is controlled by the second pulse signal $S33_2$. Both transistors have a load path that is connected between a terminal for supply potential Vs and the transmitter circuit output terminal 32, and both transistors have a control terminal for receiving one of the pulse signals $S33_1$, $S33_2$. Referring to FIG. 4 transistors $36_1$, $36_2$ may be bipolar transistors in which a collector-emitter-path forms a load path, and in which a base terminal forms a control terminal for receiving the pulse signals $S33_1$, $S33_2$. In the transmitter circuit in FIG. 4 first transistor $36_1$ serves to generate signal pulses on the transmission channel 1 that indicate rising edges of information signal $S_{in}$, and second transistor $36_2$ serves to generate signal pulses that indicate falling edges of information signal $S_{in}$. In order to enable the receiver circuit to distinguish between signal pulses indicating a falling edge and signal pulses indicating a rising edge different signal pulses are generated by the transistors $36_1$, $36_2$ from the pulse signals $S33_1$, $S33_2$. For generating different signal pulses on the transmission channel 1 first and second transistors $36_1$, $36_2$ may have different electrical characteristics. The first transistor $36_1$ according to the example is adapted to generate from the input pulse $S33_1$ received at its control input a signal pulse having a first transient, and the second transistor $36_2$ is adapted to generate from the input pulse $S33_2$ received at its control input a signal pulse having a second transient. "First transient" according to the example means a first slope of a rising edge of the signal pulse, and "second transient" means a second slope of the rising edge of the signal pulse. In the example the first transient is faster than the second transient, i.e., the first slope is steeper than the second slope. The maximum amplitudes of the signal pulses S20 may be identical or at least similar or may be different from each other.

Optionally the transmitter circuit 3 comprises first and second driver circuits $35_1$, $35_2$ each of which receives one of the pulse signals $S33_1$, $S33_2$, and provides a drive signal that depends on the respective pulse signal $S33_1$, $S33_2$ to the control terminal of one of the transistors $36_1$, $36_2$. Drive circuits $35_1$, $35_2$ are adapted to generate drive signals that are suitable to drive the transistors $36_1$, $36_2$ from the pulse signals $S33_1$, $S33_2$, where the pulse signals $S33_1$, $S33_2$ may be logic signals.

Figure 9:
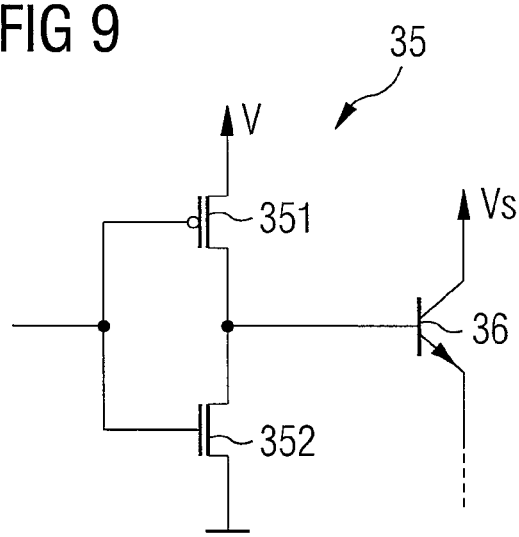
FIG. 9 illustrates an example of a driver circuit.

Instead of selecting first and second transistors $36_1$, $36_2$ such that they have different electrical characteristics transistors may be applied that have the same electrical characteristic. In this case the driver circuits are different in that they have different transfer functions, i.e., in that they provide different drive signals from one and the same signal pulse. Referring to FIG. 9 the driver circuits (FIG. 9 shows only driver circuit 35 that represents either driver circuit $35_1$ or $35_2$ according to FIG. 2) may comprise an inverter having an input that receives the pulse signal S33 (where S33 represents either signal $S33_1$ or $S33_2$ according to FIG. 2) and an output signal that drives the respective transistor 36 (where 36 represents either transistor $36_1$ or $36_2$ according to FIG. 2). The inverter according to FIG. 9 comprises two complementary transistors 351, 352 that have their load paths connected in series between terminals for a supply voltage, and that receive the pulse signal S33 on their control terminals. The amplitude of the drive signal that is provided to the transistor 36 influences the slope/transient of the rising edge of a signal pulse provided by the transistor 36 on the output 32, where the slope/transient is the lower/slower the smaller the amplitude is. The amplitude of the drive signal resulting from the pulse is signal dependent on the width-to-length (W/L) ratio of the upper (high-side) transistor 351 in the inverter. According to one example the W/L ratio of the upper transistor in the first driver circuit $35_1$ is higher than the W/L ratio of the upper transistor in the second driver circuit $35_2$ resulting in a first drive signal having a higher amplitude than the second drive signal, and therefore resulting in a first transistor $36_1$ output signal having a faster transient than a second transistor $36_2$ output signal.

Alternatively or additionally to using driver circuits $35_1$, $35_2$ having different transfer functions capacitors $37_1$, $37_2$ (FIG. 4) may be connected upstream to the control terminals of the transistors $36_1$, $36_2$. These capacitors $37_1$, $37_2$ influence the slopes/transient of the transistor output signals, where the slopes are the steeper the smaller the capacitance of the capacitor is. Referring to the present example a first capacitor $37_1$ connected to the first transistor $36_1$ has a smaller capacitance than a second capacitor $37_2$ connected to the second transistor $36_2$.

In transformers a voltage pulse (secondary pulse) is induced in the secondary winding when a voltage pulse (primary pulse) is applied to the primary winding. The amplitude of the secondary pulse is dependent on the transient of the primary pulse in such a way that the amplitude of the secondary pulse is higher the faster the transient of the primary pulse is. Referring to the example according to FIGS. 4 and 5 a signal pulse that is generated by the first transistor $36_1$ and that is applied to the input 11 of information transmission channel 1 results in a first signal pulse at the output of the transmission channel 1, and a signal pulse that is generated by the second transistor $36_2$ and that is applied to the input 11 of information transmission channel 1 results in a second signal pulse at the output of the transmission channel 1. In the example the amplitude of a first signal pulse is higher than the amplitude of the second signal pulse. Thus, for rising and for falling edges of information signal $S_{in}$ the transmitter circuit 3 effects signal pulses having different amplitudes at the output of the transmission channel 1.

Figure 6:
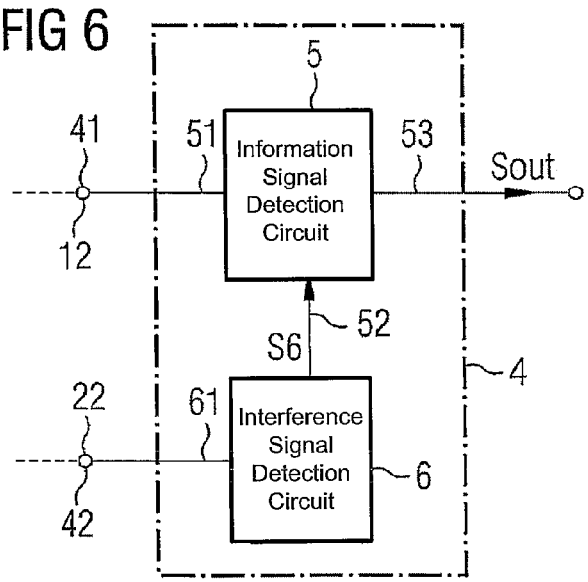
FIG. 6 illustrates an example of a receiver circuit that includes an information signal detection circuit and an interference detection circuit.

A block diagram of a receiver circuit that is adapted to detect signal pulses at the output 12 of information transmission channel 1, and that is adapted to distinguish between signal pulses having different amplitudes is shown in FIG. 6. The receiver circuit 4 includes an information signal detection circuit 5 having an input 51 that is connected to the output 12 of information transmission channel 1, and an interference detection circuit 6 having an input 61 that is connected to the output 22 of interference detection channel 2. Interference detection circuit 6 is adapted to detect pulses resulting from interference signals at the output 22 of the interference detection channel 2, and is adapted to generate an error signal S6 that is dependent on the detection of such interference signal. Information signal detection circuit 5 has an error signal input 52 for receiving the error signal S6 and is adapted to generate the output signal $S_{out}$ dependent on signal pulses as received at its input 51 and dependent on the error signal S6.

Figure 7:
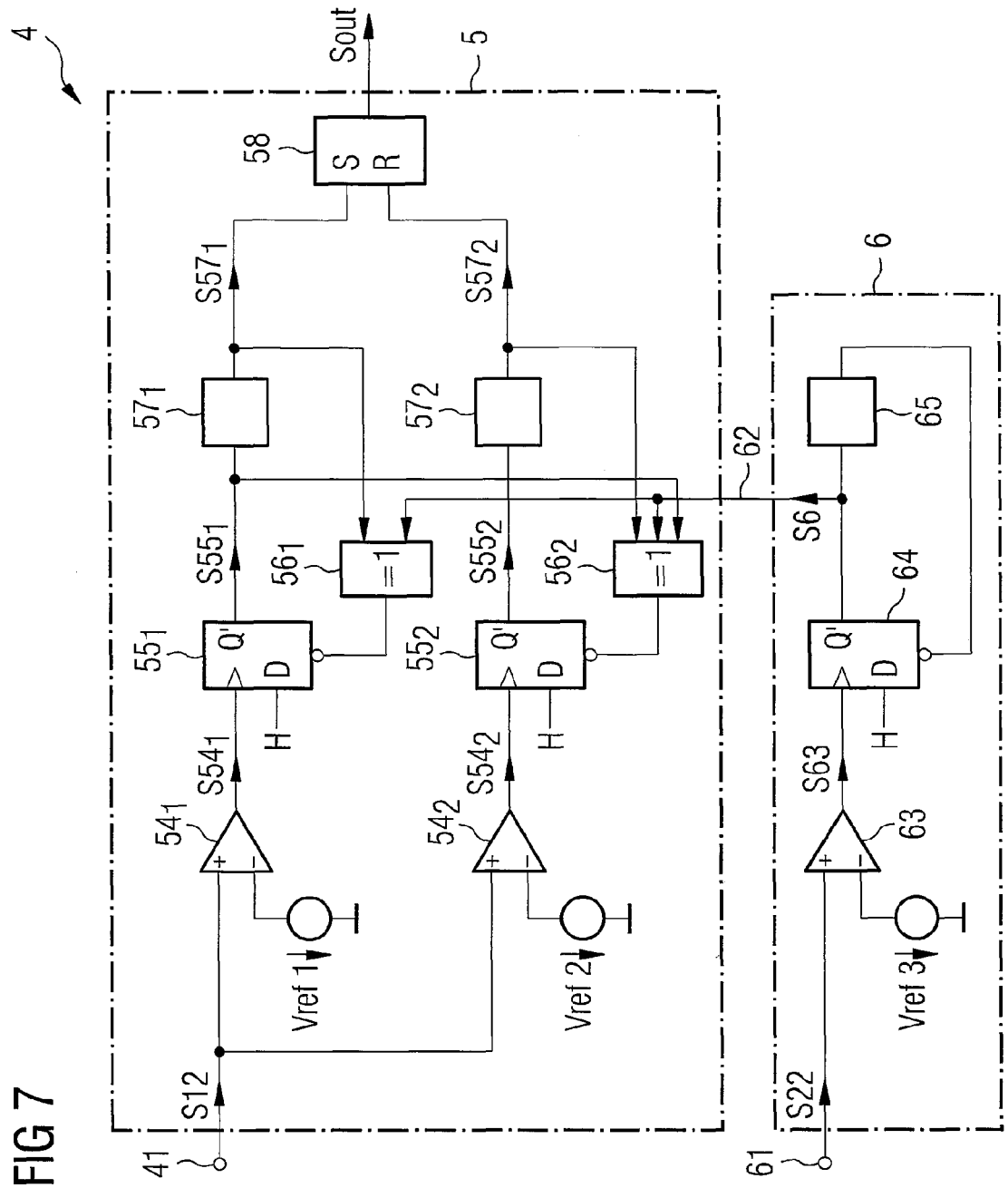
FIG. 7 shows a block diagram illustrating an example of the information signal detection circuit and the error detection circuit.

An example of the information signal detection circuit 5 and the interference signal detection circuit 6 will be explained in the following with reference to FIG. 7. FIG. 7 shows block diagrams of examples of these circuits 5, 6. The information signal detection circuit 5 according to the example includes two comparators $54_1$, $54_2$: a first comparator $54_1$ for detecting signal pulses having an amplitude higher than a first reference value Vref1; and a second comparator $54_2$, for detecting signal pulses having an amplitude higher than the second reference value Vref2. In the example noninverting inputs of both comparators $54_1$, $54_2$ are connected to the first input 41 of receiver circuit 4, inverting input of first comparator $54_1$ receives the first reference value Vref1 from a reference signal source, and the inverting input of second comparator $54_2$ receives the second reference signal Vref2 from a second reference signal source. Output signals $S54_1$, $S54_2$ of the two comparators $54_1$, $54_2$ are dependent on a comparison between the output signal S11 at the output of information transmission channel 1 and the respective reference value Vref1, Vref2. First comparator $54_1$ provides a first comparator signal S54, that assumes a first or a second signal dependent on a comparison between the first channel output signal S11 and the first reference value, and the second comparator $54_2$ provides a second comparator signal S$54_2$ that is dependent on a comparison between the first channel output signal S11 and the second reference value Vref2.

In the example level shifts from a first level to a second level of comparator output signals $S54_1$, $S54_2$ indicate the detection of signal pulses on the information transmission channel 1, or indicate times when such signal impulses are detected. For explanation purposes it may be assumed that rising edges of the comparator signals $S54_1$, $S54_2$, i.e., level shifts from a low signal level to a high signal level indicate times when signal pulses are detected on the information transmission channel 1. In the example first comparator signal $S54_1$ assumes a high signal level each time the first channel output signal S11 reaches or rises above the first reference value Vref1, and the second comparator signal $S54_2$ assumes a high signal level each time the first channel output signal S11 reaches or rises above the second reference value Vref2. In this way rising edges of comparator signals $S54_1$, $S54_2$ indicate times when the first channel output signal S11 reaches or rises above the first or second reference values Vref1, Vref2, and thereby indicate the detection of signal pulses on the information transmission channel.

Receiver circuit 4 further includes storage means (storage elements) $55_1$, $55_2$ for temporarily storing signal pulses that have been detected on the information transmission channel. These storage means assume one of two different storage states, where "storing signal pulses" in this connection means that the storage means assume a given first storage state each time the comparator signals $S54_1$, $S54_2$ indicate the detection of a signal pulse on the transmission channel. The storage means include input terminals for receiving the comparator signals $S54_1$, $S54_2$ and a reset terminal for resetting the storage means to the second storage state, i.e., for "deleting the signal pulses" stored in the storage means.

In the example of FIG. 7 the storage means include a first and a second D-flip-flops $55_1$, $55_2$. However, it should be noted that any other flip-flop or register that is adapted to assume one of two different storage states may be employed as well. Flip-flops $55_1$, $55_2$ have a clock input, a data input and a reset input. In the example the reset inputs are inverting inputs, i.e., the flip-flops $55_1$, $55_2$ are reset when a signal having a low signal level is applied to their reset input. The data inputs D of the two flip-flops $55_1$, $55_2$ permanently receive a high signal level. The comparator signals $S54_1$, $S54_2$ are provided to the clock input of the flip-flops $55_1$, $55_2$. The flip-flops $55_1$, $55_2$ in FIG. 7 may assume two different states: a first state when a rising edge of the respective comparator signal $S54_1$, $S54_2$ occurs; and a second state as long as a low-level of the respective flip-flop reset signal occurs.

Further, flip-flops $55_1$, $55_2$ each have an output Q' for providing an output signal that represents the current storage state. In the example the output Q' is an inverting output. Therefore, the output signals $S55_1$, $S55_2$ have a low signal level when the respective flip-flop $55_1$, $55_2$ is in its first state, and have a high-level when the flip-flop is in its second state. Connected downstream to the outputs Q' of first and second flip-flops $55_1$, $55_2$ are first and second delay elements $57_1$, $57_2$ that provide first and second delay signals $S57_1$, $S57_2$ dependent on the first and second flip-flop output signals $S55_1$, $S55_2$.

The information signal detection circuit 5 includes a further flip-flop 58 that receives the first delay signal $S57_1$ at its set input S and the second delay signal $S57_2$ at its reset input R. The output signal $S_{out}$ is present at an output (the non-inverting output Q in the example) of the further flip-flop 58. The delay element $57_1$, $57_2$ are so-called asymmetrical delay elements that delay first edges of flip-flop output signals $S55_1$, $S55_2$ but that do not delay second edges of flip-flop output signals $S55_1$, $S55_2$. In the present example the delay element $57_1$, $57_2$ delay falling edges of the flip-flop output signal $S55_1$, $S55_2$ for a given time period. For the following explanation it may be assumed that the delays of the two delay elements $57_1$, $57_2$ are identical. However, delay elements having different delays may either be employed.

In the circuit of FIG. 7 output flip-flop 58 is set for effecting a high signal level of output signal $S_{out}$ if first flip-flop $55_1$ keeps its first state longer than the delay time of first delay element $57_1$, i.e., if a signal pulse is stored longer than the delay time of first delay element $57_1$. In an equivalent manner output flip-flop 58 is reset for effecting a low signal level of output signal $S_{out}$ when the second flip-flop $55_2$ keeps its first state longer than the delay time of second delay element $57_2$. First flip-flop $55_1$ is reset each time output flip-flop 58 is set, and second flip-flop $55_2$ is reset each time output flip-flop 58 is reset. Resetting flip-flops $55_1$, $55_2$ by the first and second delay signals $S57_1$, $S57_2$ will be referred to as regularly resetting the flip-flops $55_1$, $55_2$. For regularly resetting flip-flops $55_1$, $55_2$ the first delay signal $S57_1$ is fed back to the reset input of first flip-flop $55_1$ via a first logic gate $56_1$—an AND gate in the example—, and the second delay signal $S57_2$ is fed back to the reset input of second flip-flop $55_2$ via a second logic gate $56_2$—an AND gate in the example. Further flip-flop 58 and first and second delay elements $57_1$, $57_2$ are part of output signal generation means that generate the output signal $S_{out}$ dependent on storage states of the flip-flops $57_1$, $57_2$, i.e., dependent on signal pulses stored in the flip-flops $57_1$, $57_2$.

In case a signal pulse is detected on the interference detection channel 2 storage elements $55_1$, $55_2$ are prevented from storing signal pulses detected on the information detection channel, or signal pulses already stored in the storage elements $55_1$, $55_2$ are deleted by resetting storage elements $55_1$, $55_2$ before the delay times of delay elements have lapsed, thereby preventing these stored signal pulses from affecting the output signal $S_{out}$ (irregularly resetting). For preventing the storage elements $55_1$, $55_2$ from storing signal pulses, or for deleting stored signal pulses, the error signal S6 is coupled to the reset inputs of storage elements $55_1$, $55_2$ via logic gates $56_1$, $56_2$, the storage elements are prevented from storing signal pulses or are reset as long as error signal S6 assumes a reset level. In the example of FIG. 7 the reset level of error signal S6 is a low signal level.

Interference signal detection circuit 6 is adapted to generate a reset level of error signal S6 for a given time period after a signal pulse has been detected on the interference detection channel 2. For detecting a signal pulse interference signal detection circuit 6 comprises a third comparator that receives the second channel output signal S22 at a first input—the non-inverting input in the example, and that receives the third reference value Vref3 at a second input, the inverting input in the example. Interference detection circuit 6 generates a reset pulse of a given duration of error signal S6 each time a signal pulse is detected on the interference detection channel, which, in the example, is each time a rising edge in the output signal S63 of the third comparator 63 occurs.

For generating the error signal S6, detection circuit 6 further comprises a third flip-flop 64 that receives the third comparator signal S63 and that is set with a rising edge of the comparator signal. An output signal of third flip-flop 64 forms the error signal. In the example error signal S6 is the output signal at the inverting output of flip-flop 64. After a delay time given by a third delay element 65 the third flip-flop is reset each time after it has been set. For this purpose the output signal of third flip-flop 64 is fed back to its reset input via third delay element 65. Like first and second delay element $57_1$, $57_2$ third delay element is an asymmetrical delay element that only delays falling edges of the flip-flop output signal S6. The delay time of the third delay element 65 may correspond to the delay time of the first and/or second delay elements $57_1$, $57_2$. However, a third delay time being different from the first and/or second delay time may be employed as well. In the example of FIG. 7 flip-flop 64 and third delay element 65 are part of error signal generation means that generate the error signal S6 dependent on the detection of a signal pulse on the interference detection channel 2.

Figure 8:
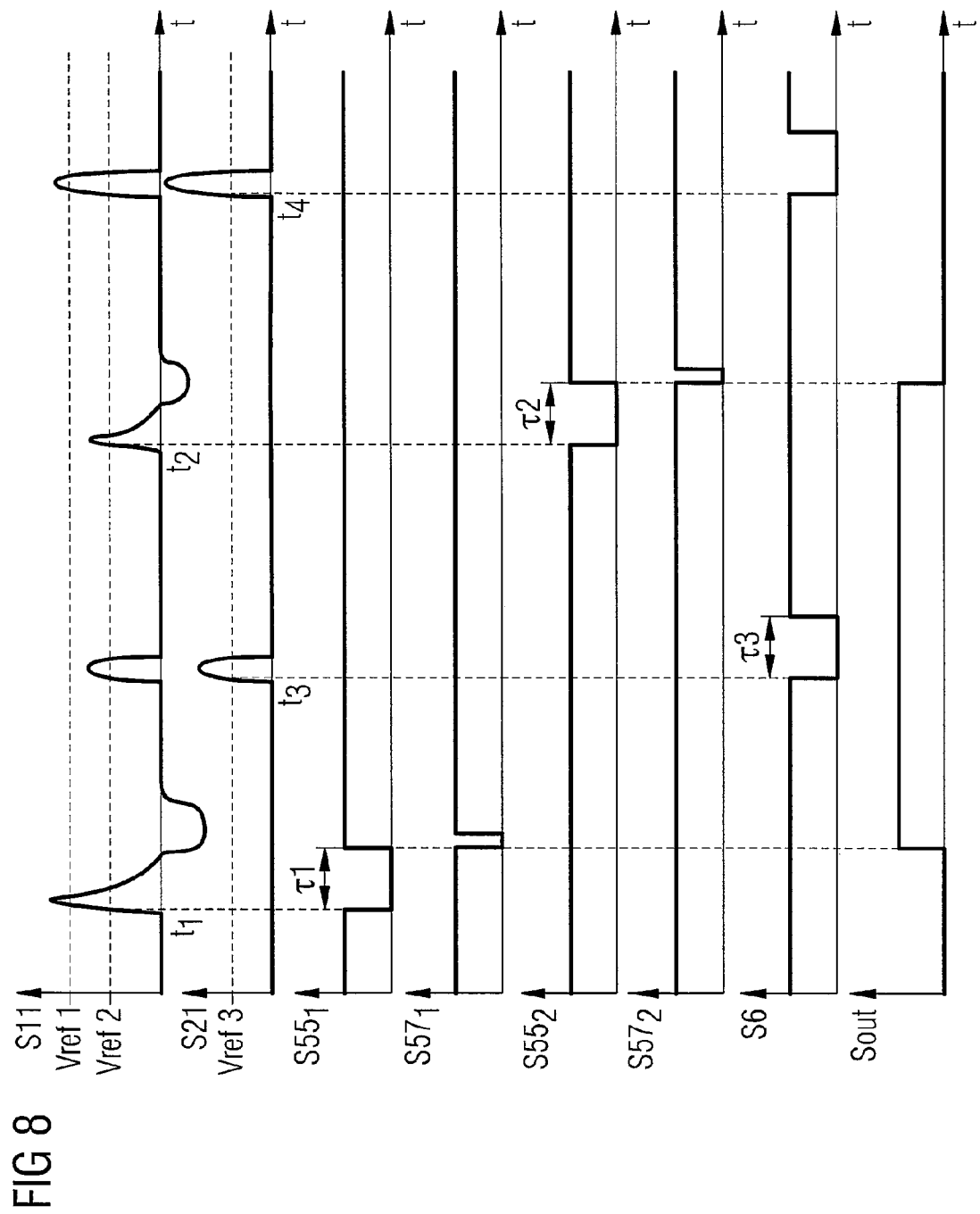
FIG. 8 illustrates the functionality of the receiver circuit according to FIG. 7 by way of timing diagrams.

The functionality of the receiver circuit in FIG. 7 will be better understood with reference to FIG. 8 in which examples of timing diagrams of the first and second channel input signals S12, S22, the first and second flip-flop output signals $S55_1$, $S55_2$, the first and second delay signals $S57_1$, $S57_2$, and the output signal $S_{out}$ are shown.

In FIG. 8, t1 denotes a time when a signal pulse having an amplitude higher than the first reference value Vref1 is detected on the information transmission channel 1. At this time first flip-flop $55_1$ is set causing its output signal $S55_1$ to go low. Referring to FIG. 7 second logic gate $56_2$ besides error signal S6, and the second delay signal $S57_2$ also receives the output signal $S55_1$ of first flip-flop $55_1$. This makes sure that only first flip-flop $55_1$ is set if a signal pulse occurs that has an amplitude higher than the first reference value Vref1, or that second flip-flop $55_2$ is immediately reset after first flip-flop $55_1$ has been set. Since no signal pulse occurs on the interference detection channel 2 within a given time window around time t1 first flip-flop $55_1$ stays set for a first delay time τ1 given by the first delay element $57_1$. At the end of the delay time a falling edge of the first delay signal occurs that sets output flip-flop 58, thereby causing output signal $S_{out}$ to assume a high signal level, and that resets first flip-flop $55_1$. Since the first delay element $57_1$ does not significantly delay rising edges of flip-flop output signal $S55_1$ the first delay signal $S57_1$ keeps a low level only for a short period that is mainly governed by propagation delays in the first flip-flop $55_1$.

In FIG. 8, t2 denotes a time when a signal pulse having an amplitude higher than the second reference value Vref2 and lower than the first reference value Vref1 is detected on the information transmission channel 1. At this time only second flip-flop $55_2$ is set causing its output signal $S55_2$ to go low. Since no signal pulse occurs on the interference detection channel 2 within a given time window around time t2 second flip-flop $55_2$ stays set for a second delay time τ2 given by the second delay element $57_2$. At the end of the delay time a falling edge of the first delay signal occurs that resets output flip-flop 58, thereby causing output signal $S_{out}$ to assume a low signal level, and that resets second flip-flop $55_2$. Since the second delay element $57_2$ does not significantly delay rising edges of flip-flop output signal $S55_2$ the second delay signal $S57_2$ keeps a low level only for a short period that is mainly governed by propagation delays in the second flip-flop $55_2$.

For explanation purposes it may be assumed that at time t3 a signal pulse is detected on the information transmission channel 1 that has an amplitude that is higher than the second reference value Vref2 and lower than the first reference value Vref1, and that at time t4 a signal pulse is detected on the information transmission channel 1 that has an amplitude that is higher than the first reference value Vref1. However, simultaneously with the detection of signal pulses on the information transmission channel 1 signal pulses on the interference detection channel are detected. Times t3 and t4 in FIG. 8 are the times when these signal pulses rise above the third threshold value. At these times reset pulses of a third duration τ3 of error signal S6 are generated that prevent flip-flops $55_1$, $55_2$ to be set for the duration of these reset pulses. Consequently flip-flops $55_1$, $55_2$ do not change their storage states, and consequently no change in the signal level of the output signal $S_{out}$ occurs. Even in the case of short delays between a pulse on the information transmission channel 1 and a pulse on the interference detection channel, the pulse on the information transmission channel does not affect the output signal. For ignoring a signal pulse that occurs on the information transmission channel before a signal pulse on the interference detection channel occurs the maximum delay time is the delay time of the first delay element, or the second delay element, respectively. In this case the first or second flip-flop $55_1$, $55_2$ is set before the signal pulse on the interference detection channel 2 is detected. However, the first or second flip-flop $55_1$, $55_2$ is reset before the first or second delay time have been reached, thereby causing the output signals $S55_1$, $S55_2$ of first or second flip-flop $55_1$, $55_2$ not to affect the output signal.

For ignoring a signal pulse that occurs on the information transmission channel 2 after a signal pulse on the interference detection channel occurs the maximum delay time is the delay time of the third delay element, since the first and second flip-flops $55_1$, $55_2$ are prevented from being set during this time period.

According to one example first, second and third delay times are identical. In this case, time windows around times when signal pulses on the interference detection channel 2 are detected and in which signal pulses on the information transmission channel are ignored are symmetrically around these detection times.

What is claimed is:

1. A signal transmission arrangement comprising:
    a receiver circuit configured to be coupled to output terminals of a first signal transmission channel, and configured to be coupled to output terminals of a second signal transmission channel, wherein the first signal transmission channel is configured to be coupled to a transmitter and the second signal transmission channel is configured to be open-ended or terminated by a passive component at an input terminal to the second signal transmission channel, wherein
    the receiver circuit is configured to detect information signal pulses and interference signal pulses on the first signal transmission channel and to provide a receiver output signal based only on the information signal pulses from the first signal transmission channel,
    the receiver circuit is configured to detect interference signal pulses on the second signal transmission channel and also to ignore corresponding detected interference signal pulses on the first signal transmission channel occurring within a given time window before or after an interference signal pulse on the second signal transmission signal has been detected.

2. The signal transmission arrangement of claim 1, wherein the receiver circuit comprises:
    an information signal detection circuit configured to be coupled to the first signal transmission channel, the information signal detection circuit receiving an error signal; and
    an interference signal detection circuit configured to be coupled to the second signal transmission channel, the interference signal detection circuit providing the error signal.

3. The signal transmission arrangement of claim 2, wherein the information signal detection circuit comprises:
    a detection circuit for detecting signal pulses on the first or second signal transmission channel;
    a storage circuit for storing signal pulses that have been detected; and
    an output signal generator for generating an output signal dependent on signal pulses stored in the storage circuit.

4. The signal transmission arrangement of claim 3, wherein the output signal generator changes a level of the output signal each time a signal pulse has been stored for a given storage time.

5. The signal transmission arrangement of claim 4, wherein the storage circuit comprises:
    a first storage element for storing signal pulses having an amplitude higher than a first reference value; and
    a second storage element for storing signal pulses having an amplitude higher than a second reference value but lower than the first reference value.

6. The signal transmission arrangement of claim 5, wherein the output signal generator changes the level of the output signal each time a signal pulse has been stored in the first storage element for a given storage time, an changes the level of the output signal each time a signal pulse has been stored in the second storage element for a given storage time.

7. The signal transmission arrangement of claim 3, wherein the interference signal detection circuit comprises:
    a detector detecting signal pulses on an information transmission channel; and
    error signal generator generating the error signal dependent on the detection of signal pulses on an interference detection channel.

8. The signal transmission arrangement of claim 7, wherein the error signal assumes a reset level, and wherein the error signal generator generates the reset level of the error signal for a first duration each time a signal pulse is detected on the interference detection channel.

9. The signal transmission arrangement of claim 8, wherein the storage circuit prevents signal pulses from being stored during the first duration of the reset level of the error signal.

10. The signal transmission arrangement of claim 8, wherein the storage circuit deletes stored signal pulses when the reset level of the error signal occurs.

11. The signal transmission arrangement of claim 1, further comprising:
    the first signal transmission channel; and
    the second signal transmission channel.

12. The signal transmission arrangement of claim 11, wherein the first and second signal transmission channels each comprise a transformer.

13. The signal transmission arrangement of claim 12, wherein the transformer comprises a coreless transformer.

14. The signal transmission arrangement of claim 1, further comprising the transmitter.

15. A method for receiving signals, the method comprising:
    detecting information signal pulses and interference signal pulses on a first signal transmission channel;
    generating an output signal dependent only on the information signal pulses on the first signal transmission channel;
    detecting interference signal pulses on a second signal transmission channel, the second signal transmission channel being open-ended or terminated by a passive component; and
    ignoring the detected interference signal pulses on the first signal transmission channel that occur within a given time window before or after an interference signal pulse on the second signal transmission channel has been detected, wherein the ignored interference signal pulses are not used for generating the output signal.

16. The method of claim 15, further comprising storing signal pulses that have been detected on the first signal transmission channel, wherein the output signal is generated dependent on the stored signal pulses.

17. The method of claim 16, further comprising changing a level of the output signal each time a signal pulse has been stored for a given storage time.

18. The method of claim 17, wherein storing signal pulses comprises:
    storing signal pulses having an amplitude higher than a first reference value in a first storage element; and
    storing signal pulses having an amplitude higher than a second reference value but lower than the first reference value in a second storage element.

19. The method of claim 18, wherein changing a level of the output signal comprises:
    effecting a first change in the level of the output signal each time a signal pulse has been stored in the first storage element for a given storage time; and effecting a second change in the level of the output signal each time a signal pulse has been stored in the second storage element for a given storage time.

20. The method of claim 16, further comprising generating an error signal dependent on the detection of signal pulses on the first signal transmission channel.

21. The method of claim 20, wherein the error signal assumes a reset level, the method further comprising generating a reset level of the error signal for a duration in which a signal pulse is detected on an interference detection channel.

22. The method of claim 21, wherein storing signal pulses comprises storing signal pulses having an amplitude higher than a first reference value in a first storage element, and storing signal pulses having an amplitude higher than a second reference value but lower than the first reference value in a second storage element, and wherein the first and second storage elements are prevented from storing signal pulses during the duration of the reset level of the error signal.

23. The method of claim 21, wherein storing signal pulses comprises storing signal pulses having an amplitude higher than a first reference value in a first storage element, and storing signal pulses having an amplitude higher than a second reference value but lower than the first reference value in a second storage element, and wherein the signal pulses that are stored in the first and second storage elements are deleted when the reset level of the error signal occurs.

* * * * *